Patented June 27, 1944

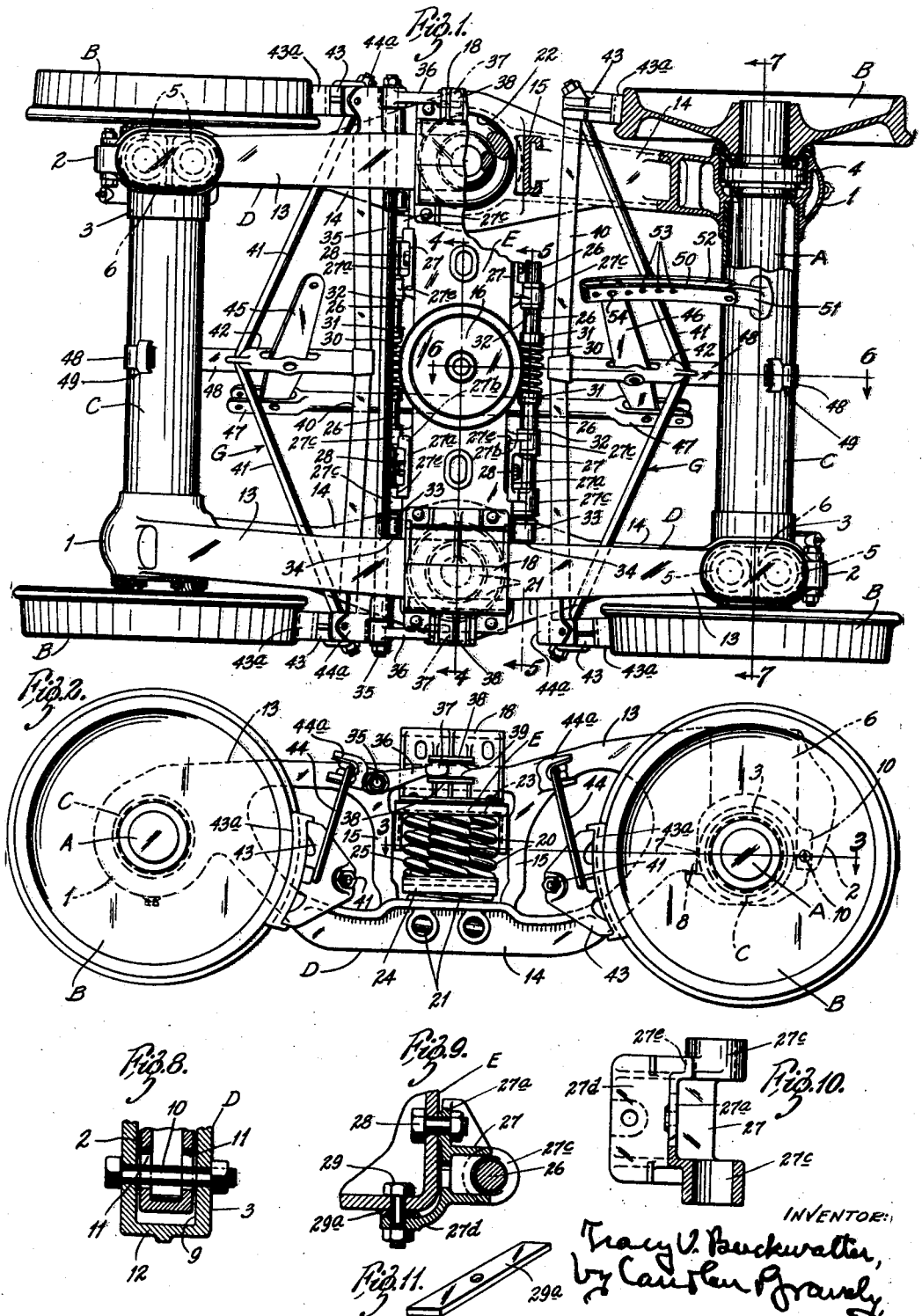

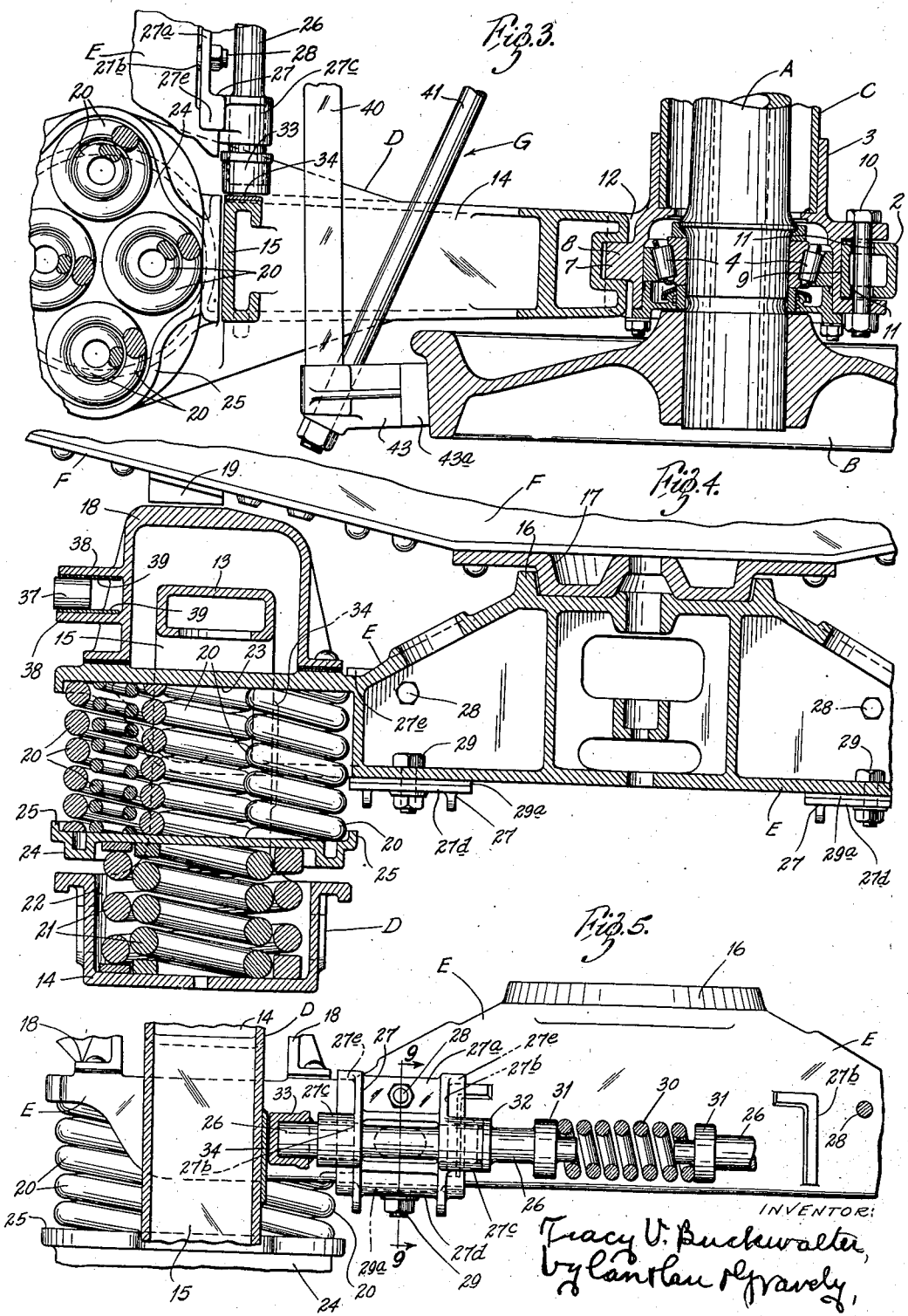

2,352,163

UNITED STATES PATENT OFFICE 2,352,163

CAR TRUCK

Tracy V. Buckwalter, Canton, Ohio, assignor to The Timken Roller Bearing Company, Canton, Ohio, a corporation of Ohio Application December 29, 1941, Serial No. 424,693

7 Claims. (Cl. 105—197.2)

This invention relates to railway car trucks, particularly spring-plankless inboard car trucks of the type shown in my Patent No. 1,640,180, dated August 23, 1927, wherein the side frames and axle housings are rigidly connected at two diagonally opposite corners of the truck and are loosely connected for relative vertical movement at the other diagonally opposite corners of said truck.

The invention has for its principal objects to provide a truck of the above type that will provide easy riding qualities for a loaded or empty car under high speed operation; that will provide increased flexibility between the side frames and the axle housings at the loose corners of the truck; that will reduce the amount of unsprung weight of the truck; that will check excessive lateral motion in the truck and return the parts to normal position; that will equalize the load on the bolster springs and prevent excessive rocking of the car body; that will provide for supporting the brake beam from the axle housing; and that will provide for mounting the fixed or dead brake lever guide or stop on the axle housing.

The invention consists in the improved railway car truck and in the construction, combinations and arrangements of parts hereinafter described and claimed.

In the accompanying drawings, which form part of this specification and wherein like symbols refer to like parts wherever they occur, Fig. 1 is a part top plan and part horizontal sectional view of a railway car truck embodying my invention, Fig. 2 is a side elevational view of said truck, Fig. 3 is an enlarged fragmentary horizontal sectional view on the line 3—3 in Fig. 2, Fig. 4 is an enlarged fragmentary vertical cross-sectional view on the line 4—4 in Fig. 1, Fig. 5 is a similar view on the line 5—5 in Fig. 1, Fig. 6 is an enlarged fragmentary vertical longitudinal sectional view on the line 6—6 in Fig. 1, Fig. 7 is an enlarged vertical cross-sectional view on the line 7—7 in Fig. 1.

Fig. 8 is a fragmentary vertical section on the line 8—8 in Fig. 6,

Fig. 9 is a fragmentary vertical section on the line 9—9 in Fig. 5,

Fig. 10 is part plan and part horizontal sectional view of one of the supporting brackets for the lateral motion resisting devices; and Fig. 11 is a perspective view of the filler plate used with said supporting bracket.

Figure 6:
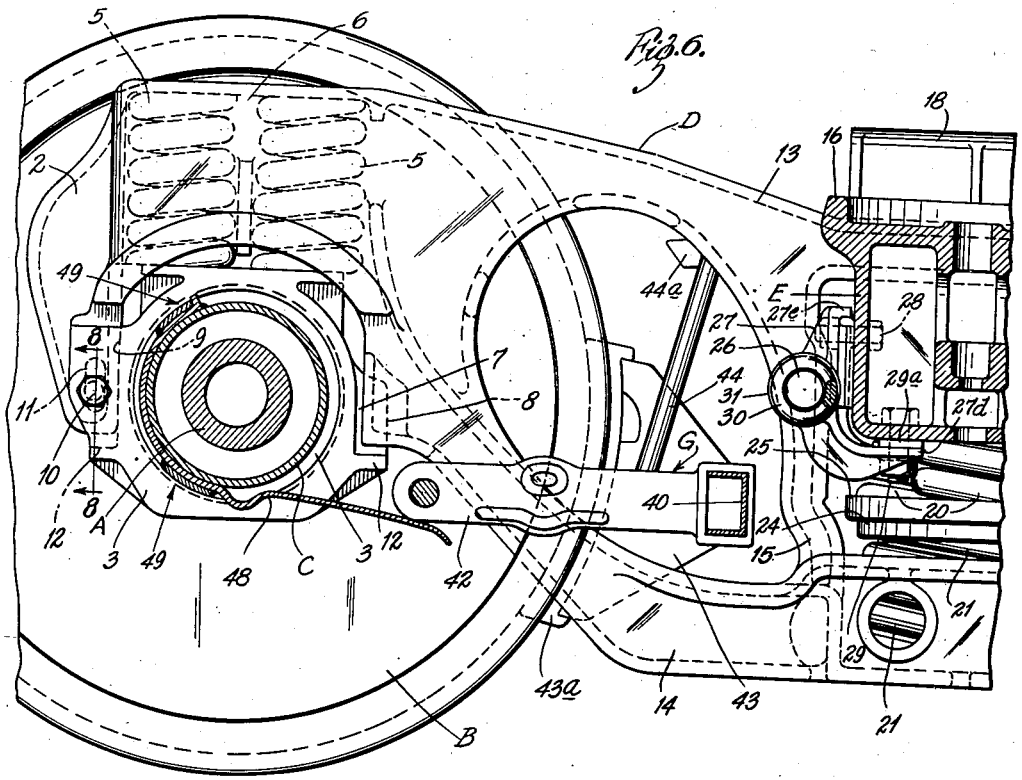
Figure 7:
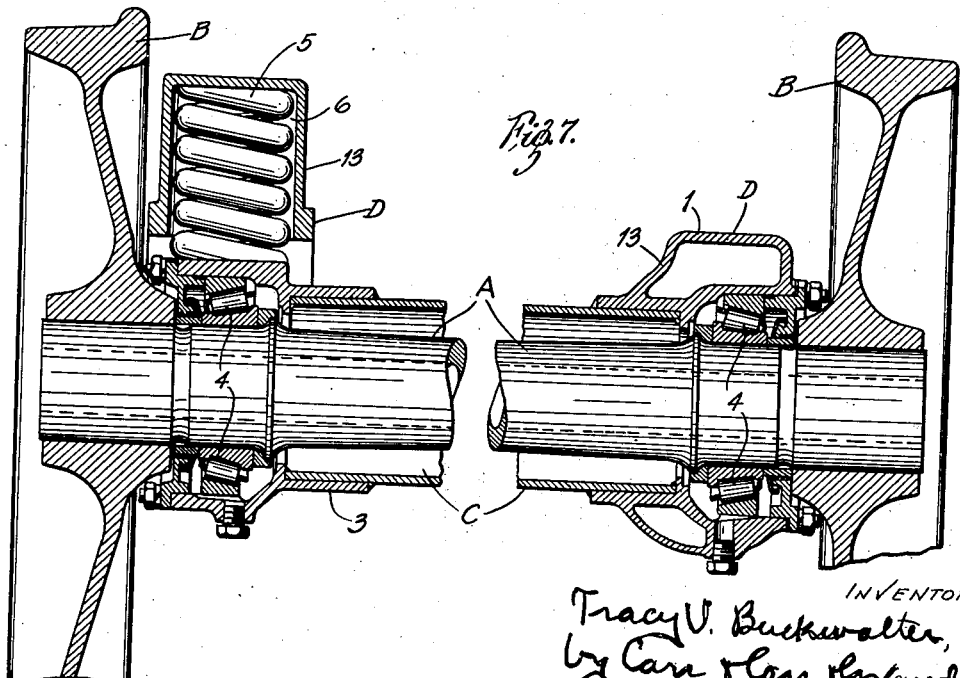

In the accompanying drawings, my invention is shown embodied in a spring-plankless inboard railway car truck of the type shown in my Patent No. 1,640,180, dated August 23, 1927, wherein a pair of axles A have wheels B fixed to the ends thereof, tubular axle housings C enclose said axles between the wheels thereon, side frames D connect said axle housings, and a cross beam or truck bolster E extends from side frame to side frame midway of the ends of said truck.

One end of each truck side frame D has a tubular portion 1 integral therewith that extends transversely thereof and has its inner end portion sleeved on and welded or otherwise rigidly secured to the adjacent end of an axle housing C and constitutes an end section or extension therefor. The other end of said truck side frame is formed with a pedestal 2 that fits over a tubular member 3 that is welded or otherwise rigidly secured to the adjacent end portion of the other axle housing and constitutes an end section or extension therefor. The tubular extensions or end sections 1 and 3 of each axle housing C constitute housings for conical roller bearings 4 that are interposed between said end sections and the axle A in said housing.

The pedestal end of each side frame D is supported on the axle housing extension 3 straddled thereby by means of a two unit group of coil compression springs 5, which rest upon a flat seat provided therefor on the top of said housing extension and seat in a downwardly opening pocket or recess 6 provided therefor in said side frame above the pedestal 2. As shown in the drawings, one of the legs of the pedestal 2 of each side frame D has a vertical slideway 7 therein for a vertical rib 8 on the opposing side of an adjacent housing section 3, while the opposite side of said section has a vertical slideway 9 therein for the other pedestal leg, thereby permitting relative vertical movement of said pedestal and housing section while preventing relative horizontal movement thereof. The pedestal 2 and housing extension 3 are held against an accidental vertical separation preferably by means of a bolt 10 that extends horizontally through registering openings provided therefor in said end section 3 and the endmost pedestal leg, the bolt opening in said pedestal leg being in the form of a vertically elongated slot 11 to permit the desired relative vertical movement of said pedestal and housing section. The axle housing section 3 has outstanding horizontal stop lugs 12 on opposite sides thereof that are located directly beneath the lower ends of the legs of the pedestal 2 so as to limit downward movement of said pedestal relative to said housing section.

The rigid connections between the truck side frames D and the axle housings C are located at two diagonally opposite corners of the truck, and the spring supported pedestal connections between said side frames and axle housings are located at the other diagonal corners of said truck. Thus, the rigid connections between the side frames D and axle housings C at two diagonally opposite corners of the truck serve to prevent the truck from going out of square, while the loose spring supported pedestal connections between said side frames and housings hold the axles horizontally but permit limited relative vertical movement of said side frames and axles at the other diagonal corners of said truck.

Each side frame D comprises a truss structure including a compression member 13 and a tension member 14 that converge toward the ends of said side frame and are connected midway of said ends by a pair of spaced upright bolster or column guides 15 that form a double strut between said compression and tension members and cooperate therewith to form an opening adapted to receive the adjacent end of the truck bolster. The truck bolster has a center plate ring 16 formed integral therewith midway of the ends thereof adapted to rotatably receive a center plate 17 fixed to the underside of the body bolster F. At each end of the truck bolster E an inverted channel-shaped side bearing plate 18 is riveted or otherwise rigidly secured to the top thereof. This side bearing member is mounted on the bolster with its downwardly opening channel disposed crosswise thereof and straddling the middle, bolster opening forming portion of the upper or compression member 13 of the truck side frame. This inverted channel-shaped side bearing has a flat bearing surface at the top thereof adapted to cooperate with the flat bottom surface of a side bearing member 19 fixed to the under surface of the body bolster F.

The truck bolster E has each end thereof yieldably supported in the bolster opening of an adjacent side frame D for vertical movement relative thereto preferably by means of an upper, four unit nest or group of double coil springs 20 and a single lower double coil spring 21. The lower spring is a relatively soft spring of relatively large diameter that seats in a circular pocket or well 22 provided therefor in the portion of the side frame tension member 14 that forms the bottom of the bolster opening; and the upper group or nest of springs 20 comprises four smaller springs that seat in a pocket 23 provided therefor on the underside of the truck bolster end and are supported on a heavy, rigid spring plate or follower 24 which, in turn, is supported on the upper end of the larger single coil spring 21. This spring follower or bumper plate 24 is disposed in the bolster opening of the side frame and overlaps the tension member 14 thereof on opposite sides of the spring supporting pocket 22 in position to seat on said member when the single lower bolster spring 21 in said pocket is compressed a predetermined amount and thus prevent further compression of said spring.

The four springs 20 of the upper spring group are arranged diamond fashion; that is, two of said springs are set close together longitudinally of the side frame and the other two springs are placed one on each side of the two first mentioned springs and are thus spaced apart thereby crosswise of said side frame. The spring receiving opening or pocket 23 in the underside of the truck bolster E at each end thereof also opens outwardly through said end and has its inner end portion shaped to conform substantially to the outline of the rear portion of the upper spring group located in said pocket; and the spring plate or follower 24, which supports said upper spring group, has an upstanding edge flange 25 having a lengthwise curvature corresponding substantially to the outline of said spring group.

The truck is provided on opposite sides of the bolster with lateral motion resisting devices. Each of these devices comprises two spaced axially alined horizontal bars or rods 26 that are mounted on the truck bolster E for independent sliding axial movement crosswise of the truck. Each of these rods is slidably supported intermediate between its ends in a suitable supporting bracket 27 having an upstanding flange 27a that fits in a vertical groove 27b provided therefor in the adjacent side face of the truck bolster, is rigidly secured in said groove preferably by means of a horizontal bolt 28, and has a pair of spaced outstanding lugs 27c with alined openings therethrough through which said rod extends. The bracket 27 also has a horizontal bottom flange 27d that extends beneath the truck bolster and is secured to the underside thereof by a vertical bolt 29, a filler plate 29a being interposed between said flange and bolster to compensate for variations in the vertical dimensions of said bracket or bolster. Interposed between the spaced adjacent ends of the two relatively movable axially alined rods 26 of each lateral motion device is a heavy, preloaded coil compression spring 30 which seats against collars 31 provided therefor on the opposing ends of said rod. The rods 26 are provided between their opposing ends and their supporting brackets 27 with rigid abutment collars 32 that are normally held by means of the coil spring 30 in abutting relation to the opposing or inner ends of said brackets; and the remote ends of said rod are provided beyond their supporting brackets with shoes 33 adapted upon relative lateral motion of the truck bolster and side frames to abut against wear plates 34 welded or otherwise secured to the inner faces of the bolster guides or columns 15 of the respective truck side frames. As shown in the drawings, the upstanding flange 27a of the angle bracket 27 has lugs 27e at the upper corners thereof that seat on the truck bolster at the upper end of the vertical groove 27b therein; and said lugs, together with the bottom flange 27d of said bracket, prevent vertical movement of said bracket relative to said bolster due to the frictional resistance between the shoes 33 of the rods 26 and the wear plates 34 during relative vertical movement of said side plates and bolster.

The truck is provided with a device for equalizing the load on the bolster springs and for preventing excessive rocking of the car body. This equalizing device comprises a rod or rock shaft 35 that extends crosswise of the truck alongside of the truck bolster and journaled in suitable transverse openings or bearings provided therefor in the respective side frames. This rod or shaft 35 extends outwardly beyond the side frames where it is provided with rigid arms 36 that terminate in convexly curved or cam-shaped free end portions 37 that are rockably and slidably supported in horizontal guide or slideways 38 provided in the outer walls of the inverted vertical shaped side bearing members 18 fixed to the ends of the truck bolster. These slideways are preferably provided with spring steel wear plates 39.

As shown in the drawings, the truck is provided with a brake gear comprising brake beams G that extend crosswise of the truck one on each side of the truck bolster E. Each of these brake beams comprises a channel-shaped compression member 40, a tension rod 41 and a strut member 42 interposed between said compression and tension members midway of the ends of the brake beam. Each brake beam G has a brake head or block 43 fixed to each end thereof, which block has a brake shoe 43a fixed thereto for cooperation with an adjacent car wheel and is suspended from an adjacent side frame by means of a brake hanger 44 that is supported at its upper end in a suitable brake hanger bracket 44a formed integral with said side frames. The strut member 42 of one of the brake beams has a live brake lever 45 fulcrumed thereon; and the strut member of the other brake beam has a dead brake lever 46 fulcrumed thereon. The lower ends of the brake levers 45 and 46 are connected by the usual brake lever connection or brake rod 47; and the upper end of the live brake lever 45 is adapted for connection with the usual pull rod (not shown) through which the brake power is applied.

Each brake beam G is provided with an auxiliary support comprising a spring bracket 48 that is clipped and welded, as at 49, to the axle housing crosswise thereof. The free end of this spring bracket 45 extends beneath the tension rod receiving end of the strut 42 of the brake beam and thus serves to yieldably support the same.

The brake gear also includes a dead lever stop or guide comprising a longitudinally curved arm 50 that is pivotally supported at one end on an upstanding bracket 51 fixed to the top of an adjacent axle housing. This guide has a longitudinal slot 52 therein for the upper end of the dead brake lever 46, a series of longitudinally spaced transverse holes 53, and a suitable locking pin 54 that is inserted through said hole and a registering hole in said brake lever.

By the arrangement described, the truck is at all times prevented from going out of square by the rigid connections between the side frames and the axle housings at two diagonally opposite corners of the truck, while the spring supported pedestal connections between said side frames and housings at the other diagonal corners of the truck provide sufficient vertical flexibility to enable the truck to accommodate itself to rough or uneven track.

The springs 5, 20 and 21 are of different length, travel and capacity and have individual oscillation characteristics. With the spring arrangement shown, different degrees of spring capacity may be obtained for different loads. The springs 5, 20 and 21 are all operative over a loading range from no load to one-half the rated car load and thus provide easy riding qualities at high speeds under such conditions of loading. At one-half load, the relatively soft, large diameter springs 21 are depressed far enough to cause the spring follower plates 24 supported thereby to seat on the tension members 14 of the side frames D, thus rendering said springs inoperative and transferring such load to the spring sets 5 and 20, thereby diminishing harmonic spring oscillations or vibrations and body roll at high speeds. At full load, the truck pedestals 2 seat on the stop lugs 12 provided therefor on the portions of the axle housings straddled thereby, thus rendering the pedestal springs 5 inoperative and thereby transferring the entire full load to the four-unit groups of main bolster supporting springs 20. Thus, the four-unit groups of springs 20 are operative under all conditions of loading to prevent heavy shocks from being transmitted between the truck and car body, while the harmonic oscillations of such springs will be interrupted or dampened by rendering the springs 21 inoperative at one-half load and the springs 5 inoperative at full load. Obviously, the capacity of the different spring sets may be varied and the follower plate 24 may be changed to seat on the side frame at different percentages of full load above or below half load.

The four-unit coil springs 20 are arranged diamond fashion, instead of the conventional square fashion, and two springs of each spring unit are in line with and within the protection of the column guides 15 of the side frame. The vertical inner walls of the spring receiving pockets 23 in the underside of the truck bolster E serve to stiffen and strengthen the bolster crosswise in the region of the bolster guides 15 against shocks when the brakes are applied and when the car is accelerated, and the shape of said pockets and the pockets 22 makes certain the assembly of springs in the proper pocket.

The lateral control devices are of simple and economical construction and effectively cushion transverse shocks between the bolster and side frames and thus enable the truck to follow track irregularities without transmitting the heavy thrust loads to the truck parts, roller bearings and wheel flanges. The supporting brackets 27 for the rods 26 of the lateral motion devices are securely bolted to the sides and bottom of the truck bolster and also engage said bolster in a manner that prevents relative movement of said brackets and bolster, thereby relieving said bolts of shearing strains caused by the heavy lateral thrusts and the frictional resistance between the outer ends of said rods and the side frames during relative vertical movement of said bolster and side frames.

The arms 36 secured to the rod 35 that extends crosswise of the truck alongside of the bolster work in the slideways 38 in the ends of the bolster and are thus jointly movable in response to an increased load on either of the side frames, thereby equalizing the load on the bolster springs on opposite sides of the truck. This torsional device also serves to equalize the rocking loads on the bolster springs and thus reduces the tendency for the car body to rock.

The inverted channel-shaped side bearing members 18 straddle the top chord or compression members 13 of the side frames and are rigidly secured to and supported on the truck bolster on opposite sides of said side frames and provide ample clearance space for both vertical and lateral movement of the bolster. It also locates the side bearings directly above the side frames and within the standard side bearing spacing required for a large percentage of cars in service.

The brake beam supporting brackets 48 yieldably support the tension members of the brake beams in the region of the struts and thus prevent the toes of the brake shoes from riding or dragging on the wheels and thus prolong the life of the brake shoes. These spring brackets are fixed to the axle housings, which are subject to very little vertical movement relative to the brake beam. Thus, said brackets are relieved of stresses that would tend to cause them to break in service.

The brake lever bar stop or guide bar 50 is pivotally supported on the axle housing, which has very little vertical movement relative to the brake beam, thereby maintaining a substantially fixed relation of said bar with respect to said brake beam and thus providing improved brake application.

Reference is hereby made to my copending applications Serial Nos. 531,848 and 531,850, both filed April 20, 1944, for subject matter divided out of this application.

Obviously, the hereinbefore described truck construction admits of considerable modification without departing from the invention. Therefore, I do not wish to be limited to the precise construction shown and described.

What I claim is:

1. A spring-plankless inboard car truck comprising wheeled axles, housings enclosing said axles between the wheels thereon, side frames connecting corresponding ends of said housings and having bolster openings therein, said side frames being rigidly secured to said housings at two diagonally opposite corners of said truck, springs supporting said side frames on said housings at the other diagonally opposite corners of said truck, a plurality of springs mounted in the bolster opening of each side frame, a bolster having its ends disposed in said bolster openings and supported on the springs therein, and means for rendering inoperative some of the bolster supporting springs and all of the side frame supporting springs at different predetermined loads on said bolster.

2. A spring-plankless inboard car truck comprising wheeled axles, housings enclosing said axles between the wheels thereon, side frames connecting corresponding ends of said housings and having bolster openings therein, said side frames being rigidly secured to said housings at two diagonally opposite corners of said truck and having pedestals straddling said housings at the other diagonally opposite corners of said truck, springs supporting said pedestals on said housings, superimposed springs supported in said bolster openings, a bolster having its ends disposed in said bolster openings and supported on the uppermost springs therein, means operative upon a predetermined load on said bolster for rendering the lowermost bolster supporting springs inoperative, and means operative upon an increased predetermined load on said bolster for rendering the pedestal supporting springs inoperative.

3. A spring-plankless inboard car truck comprising wheeled axles, housings enclosing said axles between the wheels thereon, side frames connecting corresponding ends of said housings and having bolster openings therein, said side frames being rigidly secured to said housings at two diagonally opposite corners of said truck and having pedestals straddling said housings at the other diagonally opposite corners of said truck, multi-unit groups of coil springs supporting said pedestals on said housings, single lower coil springs seated in the respective bolster openings, multi-unit groups of upper coil springs located in the respective bolster openings and supported on the single coil springs therein, a bolster having its ends disposed in said bolster openings and supported on the upper spring groups therein and means for rendering said single lower springs and said pedestal supporting springs inoperative under different loads on said bolster.

4. A spring-plankless inboard car truck comprising wheeled axles, housings enclosing said axles between the wheels thereon, side frames connecting corresponding ends of said housings and having bolster openings therein, said side frames being rigidly secured to said housings at two diagonally opposite corners of said truck and having pedestals straddling said housings at the other diagonally opposite corners of said truck, multi-unit groups of coil springs supporting said pedestals on said housings, single lower coil springs seated in the bottoms of the respective bolster openings, multi-unit coil springs located in the respective bolster openings and supported on the single coil springs therein, a bolster having its ends disposed in said bolster openings and supported on the upper spring groups therein, plates interposed between the upper and lower springs in the respective bolster openings and adapted upon a predetermined load on said bolster to seat on said side frames and render said lower springs inoperative to support said bolster, said pedestals being adapted upon a predetermined further increased load to seat on said housings and render the pedestal supporting springs inoperative to support said side frames.

5. A car truck comprising wheeled axles, side frames connecting said axles and having bolster openings therein, springs in said bolster openings, a bolster having its ends disposed in said bolster openings and supported on the springs therein, said side frames including compression members defining the upper edges of said bolster openings, inverted channel-shaped side bearing members secured to the top of said bolster and straddling the compression members of the respective side frames, each of said side bearing members having a horizontal slideway therein disposed crosswise of said bolster, and a rock shaft extending crosswise of said truck alongside of said bolster from side frame to side frame and rotatably supported therein, said rock shaft having arms rigid therewith, each supported at its free end in the horizontal slideway of one of said side bearing members.

6. A car truck comprising wheeled axles, side frames connecting said axles and having bolster openings therein, springs supporting said side frames on said axles, springs mounted in said bolster openings, a bolster supported on the springs in said bolster openings, and means operative upon a predetermined load on said bolster for rendering some of said bolster supporting springs inoperative to transmit load from said bolster to said side frame, and means operative upon an increased predetermined load on said bolster for rendering the side frame supporting springs inoperative to transmit the load from said side frames to said axles.

7. A car truck comprising wheeled axles, side frames connecting said axles and having bolster openings therein, springs supporting said side frames on said axles, superimposed springs supported in the bolster openings of the respective side frames, a bolster supported on the uppermost springs in said bolster openings, means operative upon a predetermined load on said bolster for rendering the lowermost bolster supporting springs inoperative to transmit the load from said bolster to said side frames, and means operative upon an increased predetermined load on said bolster for rendering the side frame supporting springs inoperative to transmit the load from said side frames to said axles.

TRACY V. BUCKWALTER.